Sept. 23, 1958 P. M. HOLLINGER ET AL 2,853,020
SHAFT SEAL
Filed Aug. 10, 1955 2 Sheets-Sheet 2

INVENTORS
PAUL M. HOLLINGER
JOSEPH E. MULLER
By Barrows & Taylor
ATTORNEYS

United States Patent Office 2,853,020
Patented Sept. 23, 1958

2,853,020

SHAFT SEAL

Paul M. Hollinger and Joseph E. Muller, Catasauqua, Pa., assignor to Fuller Company Application August 10, 1955, Serial No. 527,525

9 Claims. (Cl. 103—111)

This invention relates to a shaft seal, and particularly to seals for gas compressors, vacuum pumps, and the like, where it is desired to provide a seal about the shaft which will be effective against leakage either out of or into the working chamber.

In refrigeration systems utilizing compression and expansion of a gas or gases as the heat transfer mechanism, it is necessary that leakage either into or out of the system be kept to the lowest minimum attainable or, if possible, eliminated. Leakage of a coolant such as ammonia gas out of a system is dangerous to personnel in the area, as well as being costly to replace and damaging to surrounding materials through its corrosive properties. If air is allowed to leak into a system, freezing of the moisture contained in the leaked air eventually may either plug or fracture confined areas within the system, causing not only costly shutdown and repair of extensive damage, but also extremely hazardous conditions for personnel in the area, and possible loss of perishable or thermo-sensitive materials which depend upon steady refrigeration for their maintenance.

Also, in ordinary gas-compressing systems, prevention of leakage of gas from the machine, or of air into the machine is desirable. Escaping gas may produce hazardous health conditions, as well as damage surrounding material by corrosive action. Air leaking into a system may dilute or contaminate the gas, introduce damaging moisture, or offer dangerous oxygen to the system.

It is well known in the art to pressurize the shaft seals of rotary compressor shafts, either by periodic tightening of mechanical compression gaskets, or by exerted pressure on radial surface seals, generally in the form of axial spring pressure, or by closure seals bearing around and on the shaft surface, or a combination of these. It has been disclosed more recently that application of a fluid pressure in a manner which reduces and/or directs the pressure differential across the seal face will greatly reduce leakage across that face. However, heretofore no method has been found to properly effect this pressurization while simultaneously maintaining a low and/or directed differential across the seal faces throughout the wide pressure variations of a rotary machine, and avoiding serious liquid displacement from the seal reservoir system by occasional gas leakage, without costly and troublesome liquid-gas separation and return systems.

The present invention is concerned with pressurized shaft seals wherein pressurization of the seal is effected selectively, according to pressure, from either of two sources, whichever affords the higher pressure. Thus, the seal may be pressurized from pressure derived either from the working chamber of the compressor or the like, or more specifically from the shaft-bearing chamber, or from the compressor-discharge chamber. In this manner, the seal is assured a positive assisting pressure at all times during operation of the machine.

This invention also provides a convenient and reliable means for determining the level of the seal lubricant, thereby lessening the chance for dry operation and consequent failure of the seal. Other types of apparatus have been prone to false oil level readings due to elevation of the apparent fluid level by trapped gas in confined piping, thereby increasing the danger of seal damage. A constant supply of oil is critical in radial and rotating seals because of the fact that these seals have available only a small area for dissipation of frictional heat, actually being limited to the contact area of the seal itself. In reciprocating machines, the linear motion of seal rings offers a far greater amount of cylinder surface area available for heat transfer. In rotary machines, it is necessary to have a quantity of lubricant fluid, typically oil, to conduct the heat from the seals to the jacketed wall for conduction to the main compressor cooling system.

The invention will be described in connection with the accompanying drawing which illustrates a preferred embodiment of the invention.

In the drawings:

Fig. 4 is an enlarged sectional view of the shaft seal.

Figure 1:
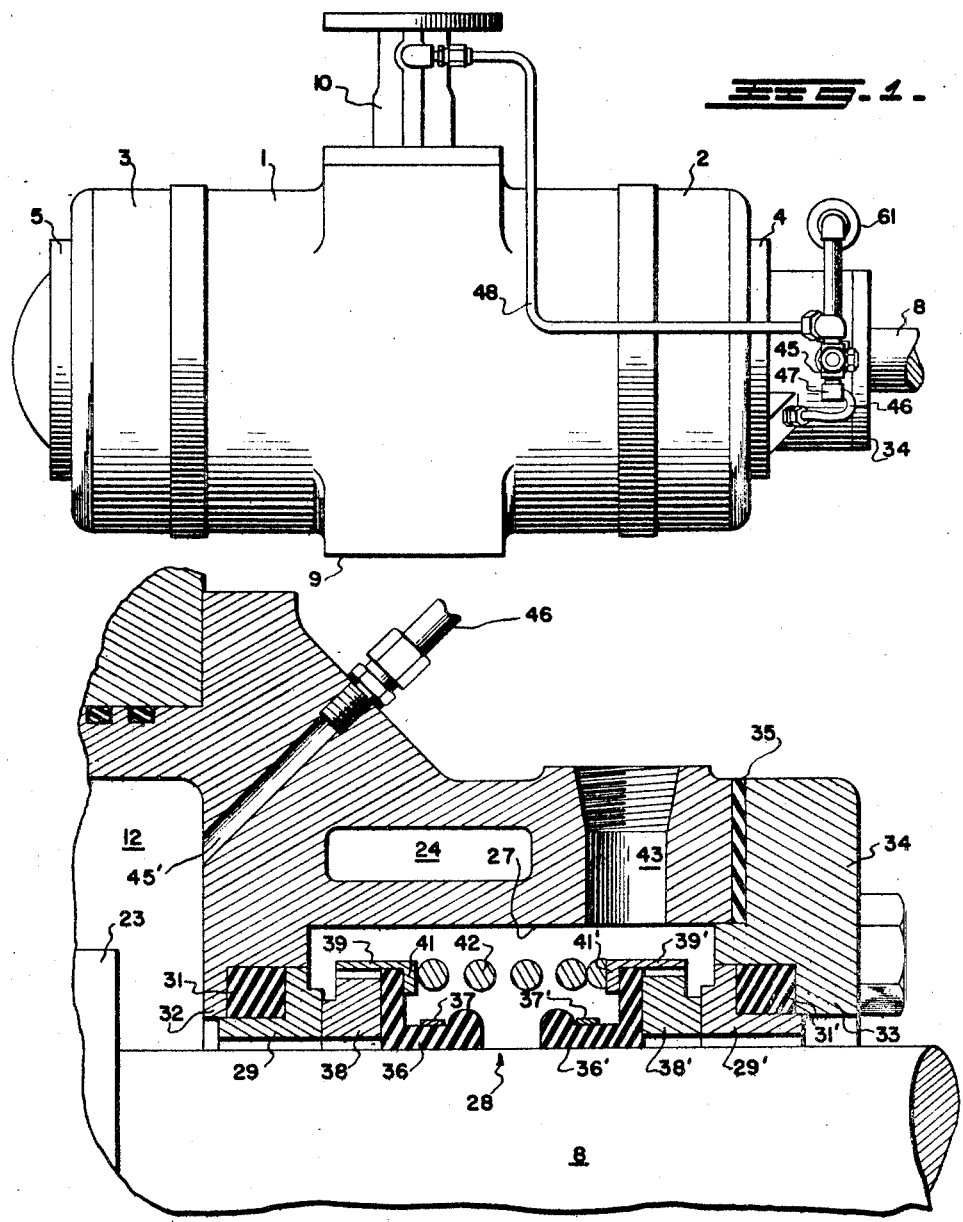
Fig. 1 is a plan view of a rotary compressor embodying the present invention.

Referring now to the drawings, the invention is shown as applied to a rotary compressor, but it is to be understood that it also is applicable to reciprocating compressors, vacuum pumps, as well as to other types of machines where it is desired to seal a shaft or the like against leakage of gas either out of or into the machine.

The compressor which may be of a known type comprises a main cylindrical casing 1 having front and rear cylinder heads 2 and 3, and front and rear main shaft bearing retainers 4 and 5 bolted to the cylinder heads.

A rotor body 6 having blades 7 is mounted within the casing 1 on a main shaft 8 which extends through the front cylinder head 2 and front bearing retainer 4 to be driven from any suitable source of power.

The compressor casing has the usual gas intake 9 and compressed gas discharge outlet 10. The outlet 10 may have a conventional non-return valve. The casing 1 and cylinder heads 2 and 3 may be cored to provide spaces 11 and 11', for the circulation of a suitable coolant.

Figures 2, 3:
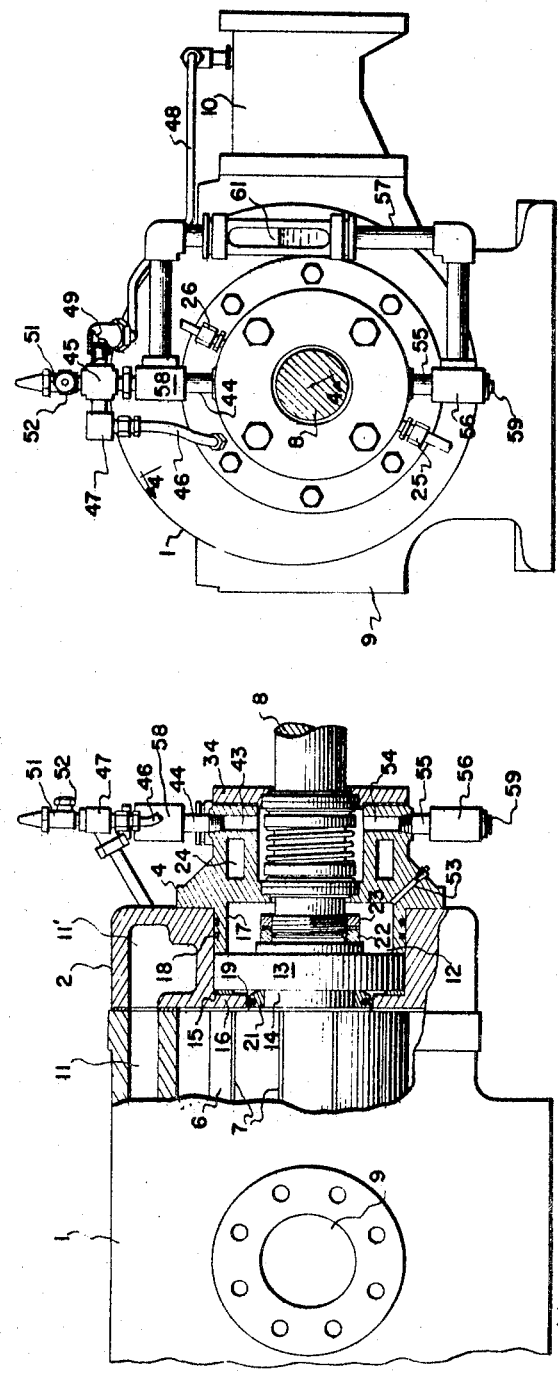
Fig. 2 is an end view of the compressor, looking from the right of Fig. 1.
Fig. 3 is a view of one end of the compressor, partly in section.

Each of the cylinder heads 2 and 3 is provided with an enlarged central opening forming a bearing chamber 12, Fig. 3, to receive a main shaft bearing 13 mounted upon a hub portion 14 of the main shaft. A bearing gasket 15 is interposed between the bearing 13 and an inwardly-extending annular flange portion 16 of the cylinder head. The shaft bearing is forced tightly against the gasket 15 by the inner end of an inwardly-extending cylindrical portion 17 of the bearing retainer which makes a snug fit with the walls defining the bearing chamber 12. The portion 17 is sealed to the walls of the bearing chamber of the cylinder head by O rings 18 compressed in peripheral grooves in the cylindrical portion 17.

The compressor chamber is partially sealed from the bearing chamber 12 by a hub-sealing ring 19 of the automotive piston type. This sealing ring is received in peripheral grooves of a seal ring retainer 21 mounted on the hub 14 of the main shaft and, at its outer face, bears against the inner annular face of the flange 16.

The shaft bearing 13 is held in proper position on the shaft hub 14 by a spacer ring 22 and a lock nut 23.

Referring to Figs. 3 and 4, it will be seen that the front shaft-bearing retainer is cored to provide a space 24 through which a suitable coolant may be circulated, the coolant entering through an inlet connection 25 and discharging through an outlet connection 26.

The shaft-bearing retainer 4 has a seal chamber 27 surrounding the main drive shaft to receive a pressureized seal assembly 28, shown enlarged in Fig. 4. This seal assembly may be of a construction presently used in rotary compressors and comprises a pair of stationary L-shaped ring members 29, 29'. The ring member 29 compresses a synthetic packing ring 31 against a shoulder 32 on the shaft-bearing retainer 4, while the ring member 29' similarly compresses a synthetic packing ring 31' against a shoulder 33 of a seal cover 34 which surrounds the main shaft and is bolted to the outer end of shaft-bearing retainer 4. The seal cover closes the outer end of the seal chamber 27, the seal being maintained by means of a suitable packing gasket 35 between the outer end of the shaft-bearing retainer and the seal cover. A pair of spaced L-shaped friction rings 36, 36' are mounted on the main shaft 8 between the stationary rings 29, 29'. The rings 36, 36' preferably are of synthetic material and are held tightly against the shaft for rotation therewith by ring bands 37, 37'. Impregnated carbon bearing rings 38, 38' are interposed between the friction rings 36, 36' and their corresponding stationary rings 29, 29'. One face of each of the carbon impregnated rings is secured to the corresponding outwardly-extending leg of the friction ring to rotate therewith, while the opposite face makes sliding sealing contact with the corresponding stationary ring 29 or 29'. Annular retainer shells 39, 39', having inturned flanges 41, 41', surround the impregnated carbon rings 31, 31' and the outwardly-protruding legs of the friction rings 36, 36'. The inturned flanges 41, 41' bear against the inner faces of the outwardly-protruding legs of the rings 36, 36'. A coil spring 42 surrounds the shaft 9 between the annular retainer shells and has its opposite ends bearing against the inturned flanges 41, 41'. Thus, the spring exerts a force through the flanges 41, 41' and rings 36, 36' against the impregnated carbon rings 38, 38', causing said rings to make an effective seal between the stationary ring 29, 29' and rings 36, 36' carried by the shaft 9.

From Fig. 4 it will be noted that the stationary rings 29, 29' and the carbon impregnated rings 38, 38' have an internal diameter slightly larger than the main shaft 8 and are slightly spaced therefrom. Consequently, the seal between the bearing chamber 12 and the seal chamber 27 is formed solely by the sides of the impregnated carbon rings 38, 38' bearing against the stationary rings 29, 29', respectively. It will be understood that while the ring bands 37, 37' hold the friction rings 36, 36' tightly against the main shaft for rotation therewith and to prevent leakage between them and the shaft, the friction rings are free to move along the shaft 8 under the force of spring 42 sufficiently to compensate for wear between the carbon impregnated rings 38, 38' and the stationary rings 29, 29'.

In operation, the seal chamber 27 is filled with oil.

Since the hub seal ring 19 is of the automotive piston type, it is used not as a 100% closure seal but as a type of limiting orifice to prevent free circulation of gas and oil between the compression or working chamber and the bearing chamber 12. Hence, the pressure in the bearing chamber will be affected by the pressure in the compression chamber and the effectiveness of the sealing ring 19.

The bearing chamber pressure is a partial function of the machine's compression ratio, which, in a rotary compressor, is fixed. The ratio, a numerical representation of the intake volume compared to the discharge volume, familiarly using the discharge volume as unity, is determined by the discharge port location. The discharge port establishes the point in the rotation or compression at which the gas is released to discharge and if that point is close to the intake port, provides a lesser compression than if it were close to the tangential point where the rotor pocket volume has been reduced to almost zero.

In normal operation, the bearing chamber pressure may vary from appreciably greater than discharge pressure to less than atmospheric pressure. This will be affected, in addition to the sources referred to above, by various factors including changes in demand on the discharge line, such as opening or closing of valves or motors; changes in the suction pressure in multiple stage systems; loading and unloading of the machine itself, which is an opening and closing of the intake port controlled by the discharge pressure through a suitable device, thereby permitting the machine to idle in a confined chamber of rarefied gas when a predetermined pressure is reached; the presence of a liquid phase of the gas, which will be discussed later; and external operational variations.

Heretofore, when the pressure in the bearing chamber 12 was appreciably above atmospheric pressure there was a tendency for gas to leak from the bearing chamber past the seal assembly 28 into the surrounding atmosphere, and when the pressure within the bearing chamber was less than atmospheric pressure there was a tendency for air of the surrounding atmosphere to leak past the seal assembly 28 into the bearing chamber and from it, past the hub seal ring 19 into the compressor chamber, with the adverse results referred to above.

In accordance with the present invention leakage past the seal assembly 28 is effectively prevented, regardless of whether the pressure in the bearing chamber 12 is above or below atmospheric pressure.

In operation, the sealing function of the seal assembly 28 is effected by the force of spring 42, as described above, but it is augmented by fluid pressure supplied either from the bearing chamber 12, or from the discharge pressure outlet 10, whichever is at the higher pressure. Thus, if the pressure in bearing chamber 12 is the higher, pressure from this chamber is made effective in the seal chamber 27 to augment the sealing forces exerted by the spring 42 on the carbon bearing rings through friction rings 36, 36'; while if the pressure in the discharge pressure outlet 10 is the greater, pressure from it is made effective in the seal chamber 27 to augment the sealing force of the spring 42.

In order to augment the sealing force of the spring 42, as just referred to, the bearing-retainer has a passage 43 extending therethrough for the admission of fluid pressure. An inlet pipe 44 is connected to the passage 43 at its lower end and to a cross fitting 45 at its upper end. One side of the cross connection 45 is connected to the bearing chamber 12 through passageway 45', pipe 46 and non-return valve 47. Thus, fluid pressure in the bearing chamber 12 is made available to augment the sealing force of the spring 42.

The opposite side of the cross fitting 45 is in communication with discharge outlet 10 of the compressor through pipe 48 and bleed valve or small orifice 49. Hence, the pressure in the discharge outlet is made available to augment the sealing force of spring 42.

If the pressure in the bearing chamber 12 is greater than the pressure in the discharge outlet 10, it functions to augment the spring 42 in making an effective seal between the sealing rings 38, 38' and the stationary rings 29, 29' to prevent leakage of fluid from the compressor chamber through the seal chamber to the surrounding atmosphere. If the conditions should become reversed, that is, if the pressure in the bearing chamber should become less than that in the discharge outlet, the pressure in the discharge outlet 10 then functions to augment the spring 42 in maintaining an effective seal to prevent reverse flow of air from the surrounding atmosphere through the seal into the bearing chamber and the compressor chamber. Hence, an effective seal is made irrespective of whether the pressure in the bearing chamber is substantially above atmospheric pressure or substantially below atmospheric pressure.

The pipe 48 connecting the discharge outlet 10 with the cross connection 45 is provided with a bleed valve or small orifice 49. This limits the flow of gas or oil from the seal chamber backward through pipe 48, and since the size of the orifice is small compared to the size of the supply from the bearing chamber 12 no serious pressure loss occurs as a result of bypassing the seal chamber through leakage to the discharge outlet when the pressure in the bearing chamber is the higher. The small orifice 49 is also effective for other purposes. It relieves the fluid pressure when the compressor is operating by gradual delivery of fluid through pipe 48 to the discharge outlet, relieves gas accumulation in the seal chamber which may result from a faulty or damaged seal or by separation of gas dissolved in the oil, as will be discussed later, and relieves vapor pressures encountered in the seal chamber when the machine is shut down.

The non-return valve 47 prevents flow of gas or oil back to the bearing chamber when that chamber is at the lower pressure.

The upper end of the cross fitting 45 is provided with an oil filler connection 51, having a filler cap 52, whereby oil may be introduced into the seal chamber 27, as occasion may demand.

The bearing retainer 4 has a drain passage 53 closed by a plug or tap to permit draining of the bearing chamber 12.

The means for determining the level of the oil or other seal lubricant is best seen in Figs. 2 and 3. As shown in these figures, the lower side of the bearing retainer 4 has a passage 54. A pipe 55 is connected to the passage 54 and through a T-fitting 56 to horizontally-positioned U-shaped piping 57 to a T-fitting 58 in the inlet pipe line 44. The lower end of the T-fitting 56 is closed by a plug or tap 59 to permit draining of the seal lubricant from the system. The vertical leg of the U-shaped piping is provided with a sight glass 61 opposite and extending above the level of the main shaft 8.

The piping 55 and 57, in effect, form a reservoir for the seal lubricant, and the height of the lubricant in the seal chamber 27 is indicated by the sight glass 61.

Placing the oil reservoir at the side instead of above or below the seal chamber, prevents expulsion of the oil by the gas, and at the same time permits quick observation of the oil level. If gas should be introduced into the seal chamber 27 beneath the oil level by leakage at the seal face between the stationary rings 29, 29' and the carbon impregnated rings 38, 38', or by being trapped under new oil when a low oil supply is replenished, or by dissolution in the oil or gas under pressure, or by any other means, the oil which might be trapped above it cannot be carried to the discharge connecting through bleed valve or orifice 49, since it is free to run off the side piping into the reservoir, and is actually siphoned to the side by the circulation of the main body of oil in replacement of the escaping gas, because of the unrestricted piping from the bottom of the reservoir to the bottom of the seal chamber 27. Since gas may dissolve in the oil when under pressure, and boil out of solution on the release of some of the pressure, any pressurizing system using a gas-oil interface will need some system of gas release. With the present arrangement, release of gas trapped or dissolved within the seal chamber 27 underneath the oil level cannot gradually deplete the oil reservoir by carryover of oil to the discharge outlet connection 10 through bleed valve or orifice 49 and tubing 48. This prevents dry operation of the seal faces and, consequently, seal damage, as may happen with known types of apparatus.

While the invention has been particularly described in connection with shaft seals for a machine for delivering fluid at a positive pressure, it is also applicable, as previously indicated, for the sealing of shafts of machines for producing negative pressure. Thus, in the normal operation of a vacuum pump, the bearing chamber pressure may vary from appreciably greater than discharge pressure to less than atmospheric pressure, and the discharge pressure may vary from atmospheric pressure to the maximum pressure of the machine. Any combination in these pressure ranges of the two pressuring sources will maintain a reliable sealing effect across the seal faces, as will be obvious to anyone skilled in the art. For machines discharging at less than atmospheric pressure, the pipe 48 is located at some point in the system which is at a pressure above atmospheric. This point may be a high pressure region of an oil trap or condenser, or may be located in the discharge line of a second compression stage discharging above atmospheric pressure.

Various changes may be made in the details of construction of the invention herein described without departing from the invention or sacrificing any of the advantages thereof.

We claim:

1. In a compressor or the like having a casing, fluid inlet and discharge means for the casing, a shaft extending through said casing, a bearing chamber surrounding the shaft, a shaft bearing in said chamber for the shaft, a member surrounding the shaft and closing the outer end of the bearing chamber and sealing means for the shaft; the improvement in the sealing means which comprises means forming a sealing chamber in the member surrounding the shaft, a substantially-stationary member, a ring member surrounding the shaft and movable into sealing engagement with the stationary member, conduit means connecting the bearing chamber with the sealing chamber for transferring a fluid pressure from the bearing chamber to the sealing chamber, conduit means connecting the fluid discharge means with the sealing chamber for transferring a fluid pressure independent of said first-named fluid pressure from the fluid discharge means to the sealing chamber, whereby the higher pressure in either said bearing chamber or said discharge means is the force exerted against said ring member to urge it against said stationary member.

2. In a compressor or the like as defined in claim 1, the further improvement in the sealing means wherein there is included resilient means constantly urging said ring member into engagement with said stationary member.

3. In a compressor or the like as defined in claim 1, the further improvement in the sealing means wherein there is included in the conduits connecting the sealing chamber with the bearing chamber and the discharge means a chamber common to both conduits and a non-return valve is included in one of said conduits between said common chamber and the source of fluid supply to which said one conduit is connected.

4. In a compressor or the like as defined in claim 3, the further improvement in the sealing means wherein the conduit having the non-return valve is the one connecting the bearing chamber with the sealing chamber.

5. In a compressor or the like as defined in claim 1, the further improvement in the sealing means wherein there is included in the conduits connecting the bearing chamber and the discharge means with the sealing chamber means defining a chamber common to both conduits and one of said conduits has a restricted orifice between said common chamber and the source of supply to which said one conduit is connected.

6. In a compressor or the like as defined in claim 1, the further improvement in the sealing means wherein there is included in the conduits connecting the sealing chamber with the bearing chamber and the discharge means a chamber common to both conduits and a non-return valve is included in one of said conduits between said common chamber and the source of fluid supply to which said one conduit is connected, and the other of said conduits has a restricted orifice between said common chamber and the source of supply of fluid pressure to which said other conduit is connected.

7. In a compressor or the like as defined in claim 6, the further improvement in the sealing means wherein the non-return valve is located in the conduit extending from the bearing chamber to said common chamber and the restricted orifice is in the conduit connecting the discharge means with said common chamber.

8. In a compressor or the like as defined in claim 1, the further improvement in the sealing means which includes a pair of spaced, substantially-stationary members through which the shaft passes, a pair of spaced ring members surrounding the shaft and positioned between the stationary members and movable into sealing engagement with said stationary members, and a spring interposed between said ring members and exerting a force against them to urge them into engagement with said stationary members.

9. In a compressor or the like as defined in claim 1, the further improvement wherein the sealing chamber is adapted to contain a fluid seal lubricant and there is included conduit means extending from a lower portion of the sealing chamber, externally of the member which surrounds the shaft, to the upper portion of the sealing chamber, and sight glass means are included in said last-named conduit at a level opposite the sealing chamber, whereby the height of oil in said sealing chamber may be observed.

References Cited in the file of this patent
UNITED STATES PATENTS

| | | |
|---|---|---|
| 2,133,524 | Baars | Oct. 18, 1938 |
| 2,404,783 | Blom | July 30, 1946 |
| 2,714,024 | Greene | July 26, 1955 |
| 2,750,894 | Thomas et al. | June 19, 1956 |